United States Patent
Oumi et al.

(10) Patent No.: US 7,057,998 B1
(45) Date of Patent: Jun. 6, 2006

(54) NEAR-FIELD OPTICAL HEAD

(75) Inventors: Manabu Oumi, Chiba (JP); Yasuyuki Mitsuoka, Chiba (JP); Norio Chiba, Chiba (JP); Nobuyuki Kasama, Chiba (JP); Kenji Kato, Chiba (JP); Takashi Niwa, Chiba (JP); Kunio Nakajima, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/462,437
(22) PCT Filed: May 7, 1999
(86) PCT No.: PCT/JP99/02393
§ 371 (c)(1), (2), (4) Date: May 16, 2000
(87) PCT Pub. No.: WO99/59149
PCT Pub. Date: Nov. 18, 1999

(30) Foreign Application Priority Data

May 11, 1998 (JP) .......................................... 10-127569
Mar. 26, 1999 (JP) .......................................... 11-084291

(51) Int. Cl.
G11B 7/00 (2006.01)
(52) U.S. Cl. .................................. 369/112.23; 369/300
(58) Field of Classification Search ............ 369/112.23, 369/13.33, 112.24, 112.25, 112.26, 118, 44.23, 369/112.01, 121, 300
See application file for complete search history.

(56) References Cited

U.S. PATENT DOCUMENTS

| | | | | | |
|---|---|---|---|---|---|
| 5,627,815 | A | * | 5/1997 | Koyanagi et al. | 369/126 |
| 5,808,973 | A | * | 9/1998 | Tanaka | 369/14 |
| 5,831,797 | A | * | 11/1998 | Schaenzer et al. | 360/234.7 |
| 5,870,362 | A | * | 2/1999 | Boutaghou | 369/44.11 |
| 6,243,350 | B1 | * | 6/2001 | Knight et al. | 369/112.24 |
| 6,396,789 | B1 | * | 5/2002 | Guerra et al. | 369/112.01 |
| 6,625,109 | B1 | * | 9/2003 | Mitsuoka et al. | 369/300 |

* cited by examiner

*Primary Examiner*—William Korzuch
*Assistant Examiner*—Bach Vuong
(74) *Attorney, Agent, or Firm*—Adams & Wilks (57) ABSTRACT

A near-field optical head applied for a head of an information recording/reading apparatus for realizing information recording and reading with high density recording medium at high speed and with reliability through interaction between a near-field light and a recording medium using a slider having a near-field optical probe. A slider (1) having a near-field optical probe is put into proximity to a recording medium (3). Further, a distance is reduced between a light emitting element (2) and a microscopic aperture (7). The microscopic aperture is controlled in protrusion amount from the recording medium (3) by a piezoelectric element. Due to this, the light intensity in the probe or light detecting section is increased to increase interaction with the recording medium (3). This realizes information recording and reading apparatus with high sensitivity and accuracy.

18 Claims, 9 Drawing Sheets

NEAR-FIELD OPTICAL HEAD

CROSS-REFERENCE TO RELATED APPLICATIONS

This application is a U.S. national stage application of copending International Application Ser. No. PCT/JP99/02393, filed on May 7, 1999 claiming a priority date of May 11, 1998, and published in a non-English language.

TECHNICAL FIELD

This invention relates to near-field optical heads and, more particularly, to a near-field optical head that a near-field microscope technology is applied to a head of a recording apparatus typically a hard disk or the like.

BACKGROUND OF THE INVENTION

The near-field microscope provided with an optical probe utilizing near-field light allows for sample observation with resolution exceeding beyond a diffraction limit of light. Such a near-field microscope has an optical probe using, at a sample-opposed end, a microscopic aperture provided at a sharpened tip of an optical fiber or in an on-silicon-substrate chip formed through anisotropic etching, or otherwise a sharpened tip of an optical fiber or a microscopic protrusion on that chip.

Meanwhile, there is a proposal of a near-field optical memory as disclosed, for example, in (E. Betzig et al., Science 257, 189 (1992)) applied with the above observation principle.

In such applications, there is a need to bring a microscopic aperture or protrusion formed in a recording or reading head into proximity to or contact with a recording medium surface, with a distance of less than a wavelength of an illumination light given as a propagation light.

The proposals on mechanisms for bringing into proximity the head and recording medium include a disclosure, for example, in (44th Applied Physics Related Association Lecture Thesis 28p-ZG-3) wherein a recording medium is rotated to cause a head having a microscopic aperture formed in a silicon substrate through anisotropic etching to float over an air film pushed through between the head and the recording medium as in a flying head used in a hard disk drive, thereby bringing into proximity the head and the recording medium.

However, in the usual flying head system as above, the air film pushed between the head and the recording medium is thick, i.e. the distance between a head bottom surface and a recording medium surface is several tens to several hundred nano-meters. This is too great to realize recording/reading utilizing a near-field light with high resolution and efficiency. In such a case, the near-field light has an intensity abruptly decreasing in an exponential fashion as gone distant from the microscopic aperture. Due to this, there has been a problem that, because the head and recording medium are positioned distant, the near-field light is low in intensity and hence a sufficient signal intensity is not obtainable. Furthermore, high resolution is difficult to realize.

Moreover, the distance between a light emitting element or light detecting element placed on a head top surface and a microscopic aperture in a head bottom surface is provided equal to a thickness of a slider. In the case of using a light emitting element, the intensity of light illuminating the microscopic aperture attenuates proportional to a square of the distance, resulting in a problem of difficulty in obtaining a sufficient signal intensity. In the case of using a light detecting element, there encounters a problem that no sufficient signal intensity is obtainable unless the light detecting section is made in a large area.

Meanwhile, during standstill of a head, the slider at its surface is contacted with a recording medium. Consequently, adsorption between the slider and the recording medium is enhanced by an adsorption water present on a recording medium surface, leading to a problem of damaging the slider and recording medium at a start of head operation. In order to avoid such a problem, conventionally a mechanism has been needed to move the slider in a direction vertical to the recording medium. This, however, results in a problem of drawback in reducing the head size.

Also, when floating the head, the slider is structurally inclined relative to the recording medium surface. Due to this, the microscopic aperture has to be arranged with tilt relative to the recording medium surface so that the microscopic aperture at one part is positioned distant from the recording medium. Because the intensity of near-field light attenuates in an exponential fashion against a distance between the microscopic aperture and the recording medium, it is difficult for the portion of the microscopic aperture that is distant from the recording medium to have sufficient interaction with the recording medium. Thus, there has been a problem of difficulty in obtaining a sufficient signal intensity.

Therefore, the present invention has been made in view of the above and it is an object of the present invention to provide a high sensitive, high resolving near-field optical head which is simple in structure with a reduced distance between a recording medium and a head, wherein control is made for a distance between the recording medium and the head to decrease a contact area of a slider with the recording medium at start and stop of operation and to put the probe out of contact with a recording medium during standstill, thus preventing damage to the probe and recording medium.

DISCLOSURE OF THE INVENTION

In order to achieve the above object, a near-field optical head according to the present invention is, in a near-field optical head, having: a slider supported by a suspension arm providing a load weight and obtaining a floating force due to a relative motion to a recording medium, and producing a gap cooperatively with the recording medium due to a balance between the load weight and the floating force; and a probe formed in a bottom surface of the slider, and producing a near-field light or converting a near-field light produced on a surface of a recording medium into a propagation light; wherein the recording medium and the probe interact through the near-field light when the slider scans a surface of the recording medium thereby recording and reproducing information; the near-field optical head characterized in that: the probe protrudes from the slider bottom surface.

Accordingly, even if the distance between the slider and the recording medium is several tens to several hundreds nano-meters, it is possible to reduce the distance between the probe and the recording medium to as small as several to several tens nano-meters. This enhances interaction between the near-field light and the recording medium, thereby enabling recording with high sensitivity and high density. Also, at a start and stop of head operation, the slider bottom surface and the recording medium is small in contact area and hence can be protected from damage due to contact.

Also, a near-field optical head according to the invention, in the first-stated near-field optical head, is characterized in that the probe is a microscopic aperture.

Accordingly, in addition to the first-stated effect, it is possible to cause interaction between the recording medium and the probe due to a light principally based on a near-field light. Thus, high S/N is obtainable.

Also, a near-field optical head according to the invention, in the first-stated near-field optical head, is characterized in that the probe is a microscopic protrusion.

Accordingly, in addition to the first-stated effect, it is satisfactory to form as a probe a simplified protrusion without having an internal structure. Therefore, the probe is easy to manufacture, and can be stably manufactured at low cost.

Also, a near-field optical head according to the invention, in any one of the above near-field optical heads, is characterized by comprising a mechanism which accommodates the probe in the slider bottom surface or an inside of the slider except upon recording or reproducing of the information, and protrudes the probe from the slider bottom surface by or in a predetermined amount or direction upon recording or reproducing the information.

Accordingly, in addition to any of the effects, the slider bottom surface and the recording medium surface can be protected from damage in both modes of during head standstill and at operation start/stop. Also, the parallel arrangement of the probe with the recording medium surface realizes high sensitive head.

Also, a near-field optical head according to the invention, in any one of the above near-field optical heads, is characterized in that the probe is formed in a plurality of number in the slider bottom surface, the plurality of probes being individually set with the amount or direction of protrusion or both thereof on an each probe basis.

Accordingly, in addition to any of the effects, it becomes possible to define a sensitivity on a probe-by-probe basis. Also, one probe can be utilized for tracking or high-speed reproduction.

Also, a near-field optical head according to the invention, in any one of the above near-field optical head, is characterized by comprising a mechanism which simultaneously controls the amount or direction of protrusion of the probe or both thereof, and scans the slider over the recording medium.

Accordingly, in addition to any of the effects, it becomes possible to control sensitivity, resolution and the like simultaneously with data recording/reproducing. Also, even where there are concaves and convexes on the recording medium surface, because recording/reproducing is possible, increase of density is possible.

Also, a near-field optical head according to the invention, is characterized by comprising: a slider supported by a suspension arm providing a load weight and obtaining a floating force due to a relative motion to a recording medium, and producing a gap cooperatively with the recording medium due to a balance between the load weight and the floating force; at least one hole in an inverted frustum form formed through the slider so as to provide at an apex a microscopic aperture in the slider bottom surface; and a light emitting element or light detecting element provided in a bottom of the inverted frustum formed hole; wherein a distance between the microscopic aperture and the light emitting element or light detecting element is given shorter than a thickness of the slider.

Accordingly, even if the thickness of the slider is several hundred micro-meters, it is possible to reduce a distance between the microscopic aperture and the light emitting element or light detecting element to several tens micrometers or less. Thus, the intensity of light at the microscopic aperture can be increased thereby realizing a high sensitivity head.

BEST MODE FOR PRACTICING THE INVENTION

The present invention will be concretely explained below with reference to the drawings. It should be noted that the invention is not limited by the embodiments thereof.
(Embodiment 1)

Figure 7:
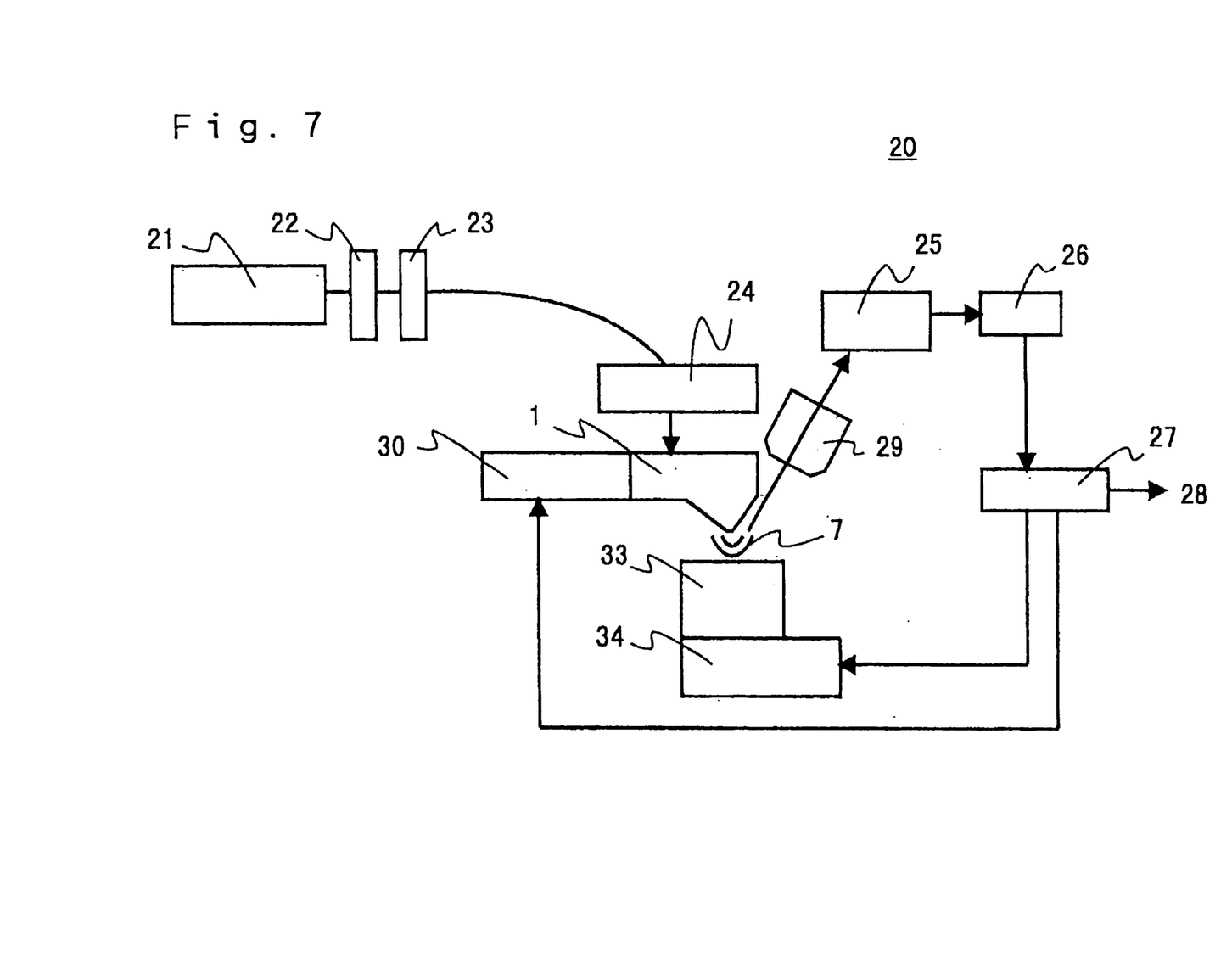
FIG. 7 is a structural view of an information reproducing apparatus using a near-field optical head according to Embodiment 1 of this invention.

FIG. 7 shows a structure of an information recording/reproducing apparatus using a near-field optical head according to Embodiment 1 of the present invention. This information reproducing apparatus 20 is provided with a laser oscillator 21, wavelength plates 22 and 23 for controlling a polarization of a laser light, an optical waveguide 24 for transmitting through the laser light, an optical head 1 having a microscopic aperture, an optical head drive actuator 30, a lens 29 for focusing a scattering light caused due to interaction between a near-field light 7 and a recording medium 33, a light detecting element 25 for receiving a scattering light, an output signal processing circuit 26, a control circuit 27, and a recording medium drive actuator 34 for controlling a position of the recording medium 33. The polarization of the light produced from the laser oscillator 21 is controlled by the wavelength plates 22, 23, and introduced to the optical head 1 through the optical waveguide 24.

As will be stated later in FIG. 1, a near-field light 7 caused at a bottom surface of the optical head interacts with the recording medium 33. As a result, a scattering light is produced. Although FIG. 7 showed a structure for detecting an upwardly reflected one of the scattering light with respect to the recording medium, it is easy to make a structure for detecting the transmission light through the recording medium. The scattering light is focused by the focusing lens 29 and then converted into an electric signal by the light detecting element 25. This signal is sent to the output signal processing circuit 26 where it is subjected to processing of signal component extraction and the like, and thereafter sent to the control circuit 27. The control circuit 27 generates a data output 28 based on the received signal, and sends control signals to the optical head drive actuator 30 and the recording medium drive actuator 34.

Figure 1:
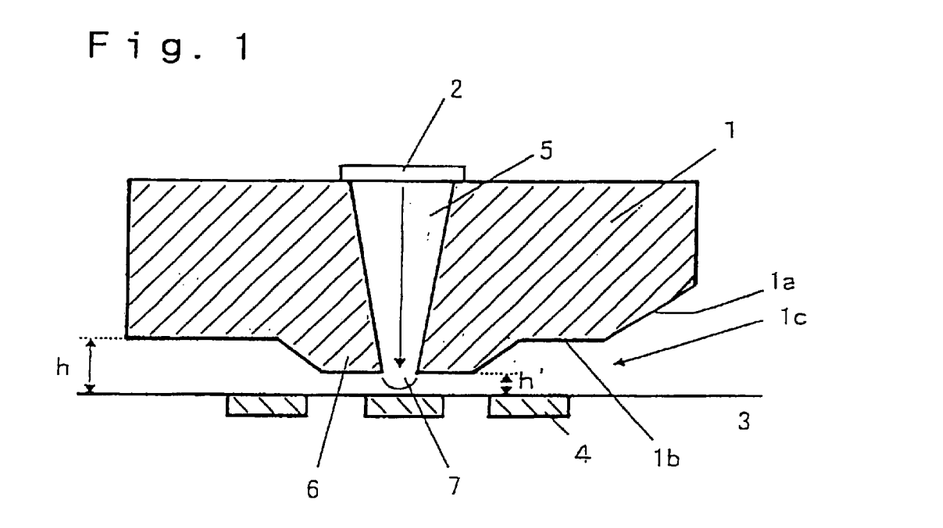
FIG. 1 is a schematic structural view showing a near-field optical head according to Embodiment 1 of this invention.

FIG. 1 is a schematic structural view showing a near-field optical head according to Embodiment 1 of the present invention. More specifically, it illustrates a sectional structure of a recording medium and a position in accessing the recording medium. A slider 1 is supported by a suspension arm (not shown). The suspension arm and slider 1 constitute a flying head mechanism. The suspension arm has a voice coil motor (not shown) as its drive source to cause swing about a swing shaft. The slider 1 has a taper 1*a* provided at its scanning direction. The taper 1*a*, slider bottom surface 1*b* and recording medium 3 surface form an air passage 1*c* in a wedge film form. The slider 1 is applied by a load weight directed toward the recording medium 3 by the suspension arm and gimbals spring. The slider 1 is positioned on a track of the recording medium 3 through seek and following control. The slider 1 has a probe comprised of a hole in an inverted frustrum form as a light passage 5. Although in the present embodiment the light passage 5 is made in an inverted frustrum form, it may be in a rectangular parallelpiped or circular columnar form. The light passage 5 has one tip having a microscopic aperture 7 provided in the slider 1 bottom surface and an opposite tip covered by a light emitting element 2 bonded on a top surface of the slider 1. The recording medium 3 is formed thereon with a record region 4 to accommodate unit data. The slider bottom surface has a protruding portion 6 in the vicinity of the microscopic aperture 7 that is protruded from the slider 1 bottom surface toward the recording medium 3. Due to this, a distance h' between the microscopic aperture 7 and the recording medium 3 surface is smaller than a distance h between the slider bottom surface 1*b* and the recording medium 3 surface. The slider possessing such structure is manufactured by a semiconductor microlithography technique such as anisotropic etching. The light emitted by the light emitting element 2 is guided to the microscopic aperture 7 through the light path 5. Here, because the microscopic aperture 7 is smaller than a wavelength of light, a light field based on a near-field light is generated on the microscopic aperture 7 on a recording medium 3 side. This near-field light and the memory region 4 interact to effect recording/reading of data. The distance h between the bottom surface of the slider 1 and the surface of the recording medium 3 is typically several tens to several hundred nano-meters. Hence, there is difficulty in causing the near-field light to interact with the memory region 4 with sufficient intensity. However, because there is protrusion in the vicinity portion 6 of the microscopic aperture 7, the microscopic aperture 7 is positioned in proximity to the surface of the recording medium 3. The intensity of the near-field light exponentially attenuates with respect to a distance from the microscopic aperture 7. Accordingly, it is critical to position the microscopic aperture 7 as close as possible to the memory region 4. With the structure of the present embodiment, the microscopic aperture 7 can be put in proximity to the surface of the recording medium 3. This makes it possible to cause a sufficient intensity of near-field light interaction, thus realizing a highly sensitive optical head. Also, the proximity of the microscopic aperture 7 to the surface of the recording medium 3 allows the memory region 4 on the surface of the recording medium 3 to be made small in area, realizing a high resolution optical head. Also, because the slider 1 and the recording medium 3 surface are structurally in contact only at the protruding portion 6 in the vicinity of the microscopic aperture 7, there is weakening in adsorption force created due to adsorption water or the like between the slider 1 and the recording medium 3. Thus, there is less mechanical damage to the slider 1 and recording medium 3 upon start and stop of head operation.

A similar effect was obtained where a light detecting element was used in place of the light emitting element 2. The proximity of the microscopic aperture 7 to the recording medium 3 makes it possible to cause a sufficient intensity of near-field light interaction so that a scattered near-field light as a propagation light reaches the light detecting element with high intensity. This realized an optical head with high sensitivity and resolution.

(Embodiment 2)

Figure 2:
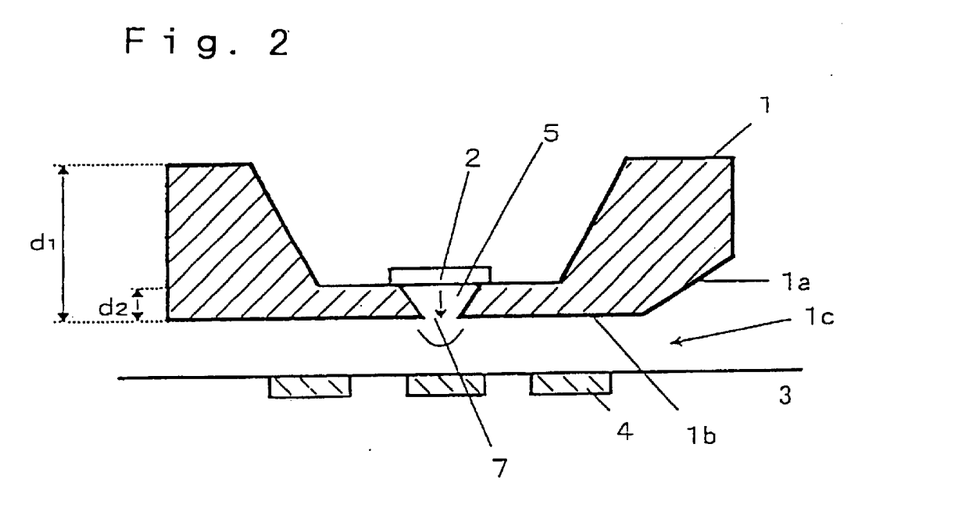
FIG. 2 is a schematic structural view showing a near-field optical head according to Embodiment 2 of this invention.

FIG. 2 is a schematic structural view showing a near-field optical head according to Embodiment 2 of the invention. The operation mechanism is the same as Embodiment 1, hence omitting explanation thereof. In the present embodiment, a slider 1 is structured by a top surface dug down to bonded with a light emitting element 2, as compared to the other portion. The slider with such a structure is fabricated by a semiconductor manufacturing technology such as anisotropic etching. Although in the conventional structure the light from the light emitting element 2 has to travel over a distance d1 from a top surface of the slider 1 to the microscopic aperture 7, in the present embodiment it may satisfactorily travel only by a distance d2. The light intensity at the microscopic aperture 7 has an attenuation in proportion to a square of a distance from the light emitting element 2 to the microscopic aperture 7. Accordingly, it is critical to decrease the distance between the light emitting element 2 and the microscopic aperture 7. In the present embodiment, however, the light emitting element 2 is structurally close to the microscopic aperture 7, thus improving input light intensity at the microscopic aperture 7. In order to effect data recording/reading with high sensitivity, it is critical to produce a sufficient strength of a near-field light. One way for realizing it is to increase a light intensity at the microscopic aperture 7. This embodiment has realized it. Similar effect was obtained where a light detecting element was used in place of the light emitting element 2. The slider 1 top surface, onto which the light detecting element is bonded, is structured by digging down as compared to the other portion. Thus, the light detecting element is structurally positioned close to the microscopic aperture 7 so that the light detecting portion with a small area can obtain a sufficient signal intensity. Thus, an optical head with high resolution was realized.

(Embodiment 3)

Figure 3:
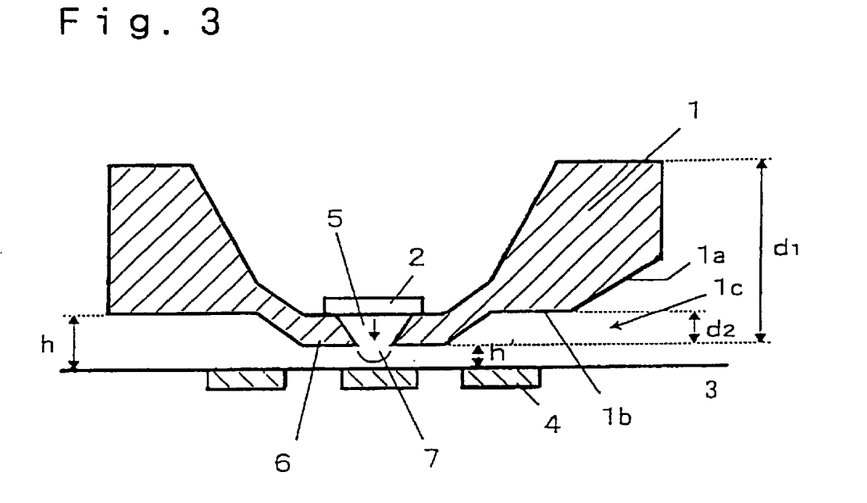
FIG. 3 is a schematic structural view showing a near-field optical head according to Embodiment 3 of this invention.

FIG. 3 is a schematic structural view showing a near-field optical head according to Embodiment 3 of the invention. The difference from Embodiment 1 lies in a structure that a slider 1 top surface on which a light emitting element 2 is bonded is dug down as compared to the other portion. The other structures and manufacturing method are similar to Embodiment 1, hence omitting explanations thereof. Although in Embodiment 1 the light from the light emitting element 2 has to travel over a distance d1 from a top surface of the slider 1 to the microscopic aperture 7, in the present embodiment it may satisfactoily travel only by a distance d2. The input light intensity at the microscopic aperture 7 can be improved similarly to Embodiment 2. Furthermore, the slider bottom surface has a vicinity portion 6 of a microscopic aperture 7 protruded toward a recording medium, making it possible to put the microscopic aperture 7 close to a recording medium 3. In the present embodiment, the distance over which a near-field light is to reach for realizing data recording/reading with high sensitivity and high density is not the conventional h but a shorter h'. Thus, a sufficient intensity of near-field light interaction is caused, realizing data recording/reading with high sensitivity and high density. Also, at a standstill of the head, the slider 1 is in contact with a surface of the recording medium 3 without flying over the recording medium 3 surface. However, because the slider 1 and the recording medium 3 surface are structurally in contact with only at the vicinity portion 6 of the microscopic aperture 7, there is weakening in adsorption force acted due to adsorption water or the like between the slider 1 and the recording medium 3. Thus, there is less mechanical damage to the slider 1 and recording medium 3 upon start and stop of head operation. A similar effect was obtained if a light detecting element was used in place of the light emitting element 2 as in Embodiments 1, 2 and 3.

(Embodiment 4)

Figure 4A:
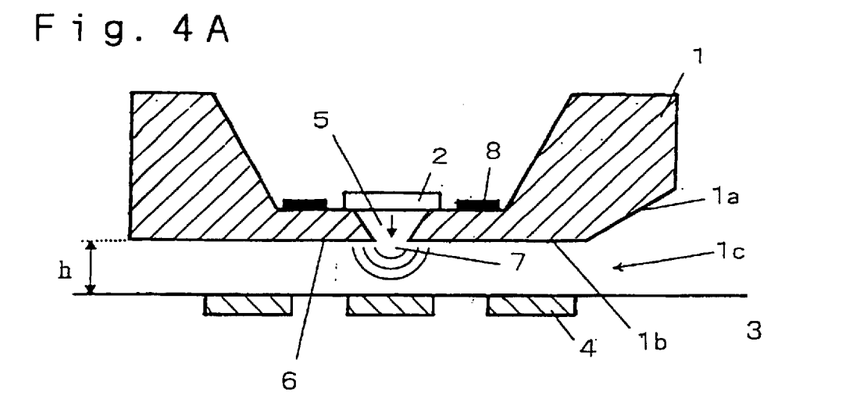
FIG. 4 is a schematic structural view showing a near-field optical head according to Embodiment 4 of this invention.
Figure 4B:
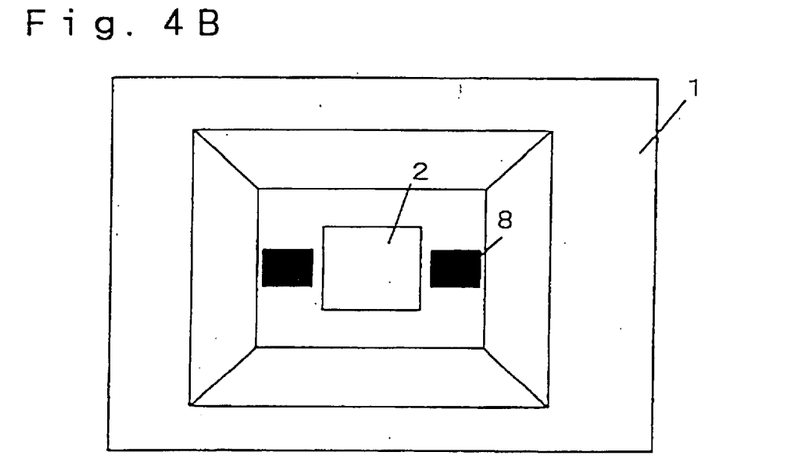
Figure 4C:
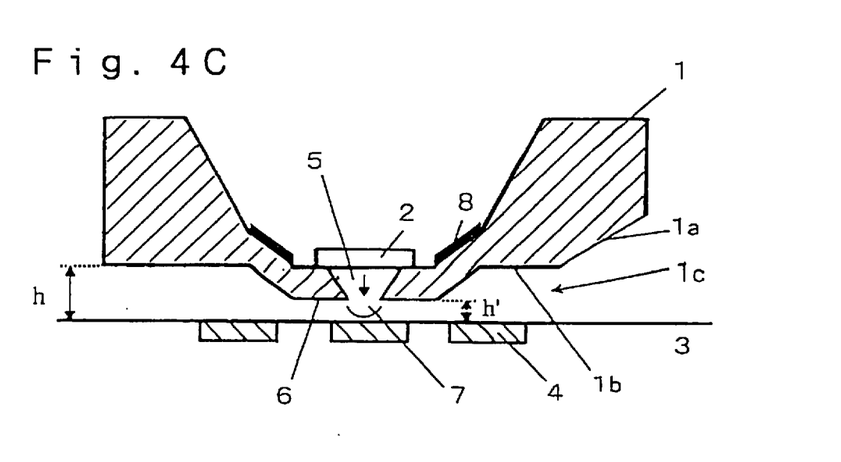

FIG. 4 is a schematic structural view showing a near-field optical head according to Embodiment 4 of the invention. The difference from Embodiment 3 lies in a structure that a microscopic aperture portion 7 is protruded from a slider 1 due to piezoelectric elements 8. The other structures and manufacturing method are similar to Embodiment 3, hence omitting explanations thereof. FIG. 4(b) is a head top view wherein piezoelectric elements 8 are bonded on both sides of a microscopic aperture portion 7. As shown in FIG. 4(c), a potential is applied to the piezoelectric elements 8 to cause volumetric change therein to thereby protrude the vicinity portion 6 of the slider microscopic aperture portion 7 toward the recording medium 3. By controlling the voltage applied to the piezoelectric elements 8, the microscopic aperture portion 7 can be accommodated in the slider 1 bottom surface or protruded from the slider 1 bottom surface.

During a standstill of the head, the microscopic aperture portion 7 is accommodated in the slider 1 bottom surface whereby adhesibility is enhanced for the slider 1 and the recording medium 3 to prevent damage due to external vibration. At a start and stop of head operation, the microscopic aperture portion 7 is protruded from the slider 1 bottom surface to decrease the adhesibility between the slider 1 and the recording medium 3, effecting operation start and stop with resistance reduced. This mechanism, in the present embodiment, makes unnecessary a mechanism for moving vertically the slider 1 from the recording medium 3. Also, during head operation the microscopic aperture portion 7 of the slider 1 is protruded toward a direction of the recording medium 3, enabling the microscopic aperture portion 7 to be brought into proximity to the recording medium 3. Due to this, the distance over which a near-field light has to reach for realizing data recording/ reading with high sensitivity and high density is not the conventional h but a shorter h'. Accordingly, a sufficient intensity of near-field light interaction is caused to realize data recording/reading with high sensitivity and high density. A similar effect was obtained where a light detecting element was used in place of the light emitting element 2.

(Embodiment 5)

Figure 5:
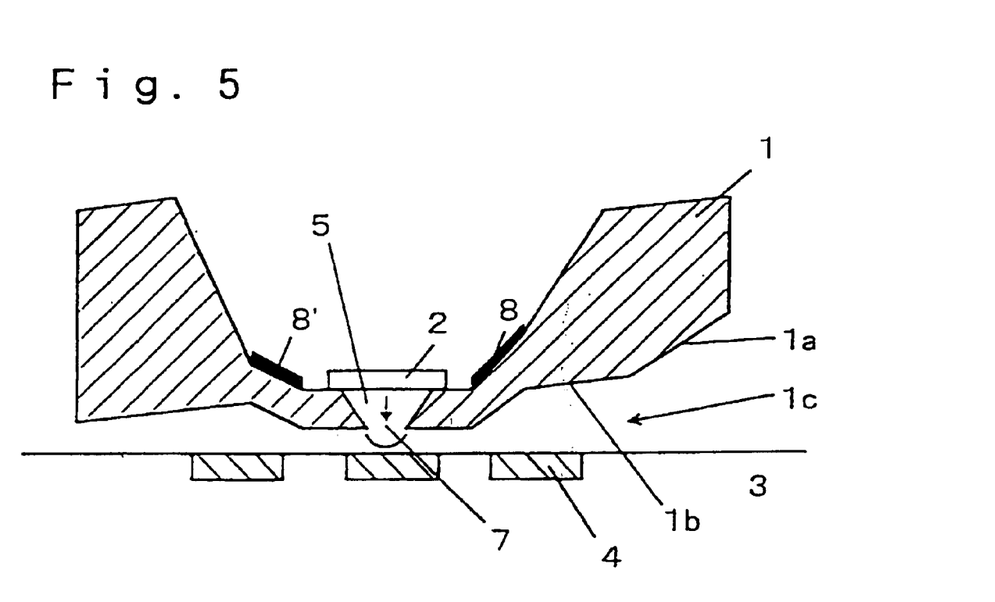
FIG. 5 is a schematic structural view showing a near-field optical head according to Embodiment 5 of this invention.

FIG. 5 is a schematic structural view showing a near-field optical head according to Embodiment 5 of the invention. This is similar to Embodiment 4 except in that a slider 1 is arranged inclined at its bottom surface with respect to a surface of a recording medium 3 and that piezoelectric elements 8 and 8' are different in volumetric change amount, omitting explanations. The present embodiment, in addition to the effect possessed by Embodiment 4, applies different application voltages to the piezoelectric elements 8 and 8' thereby correcting the slider 1 for inclination relative to the recording medium 3. Thus, it became possible to control the microscopic aperture 7 such that it is positioned parallel with the recording medium 3. The near-field light attenuates exponentially with respect to a distance from the microscopic aperture 7. Consequently, the arrangement of the microscopic aperture 7 in parallel with the recording medium 3 realized to produce a near-field light with an even intensity over the entire microscopic aperture 7. Due to this, the present embodiment realized the effect possessed by Embodiment 4. As an effect besides that, a near-field light producing source is provided by the entire region of the microscopic aperture 7. Thus, a sufficient intensity of near-field light interaction was obtained.

(Embodiment 6)

Figure 6A:
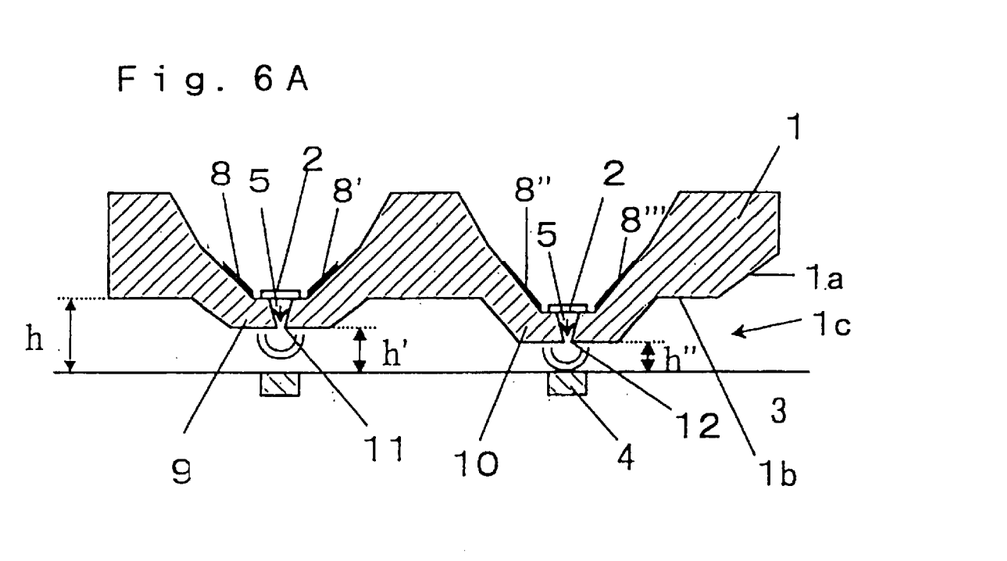
FIG. 6 is a schematic structural view showing a near-field optical head according to Embodiment 6 of this invention.
Figure 6B:
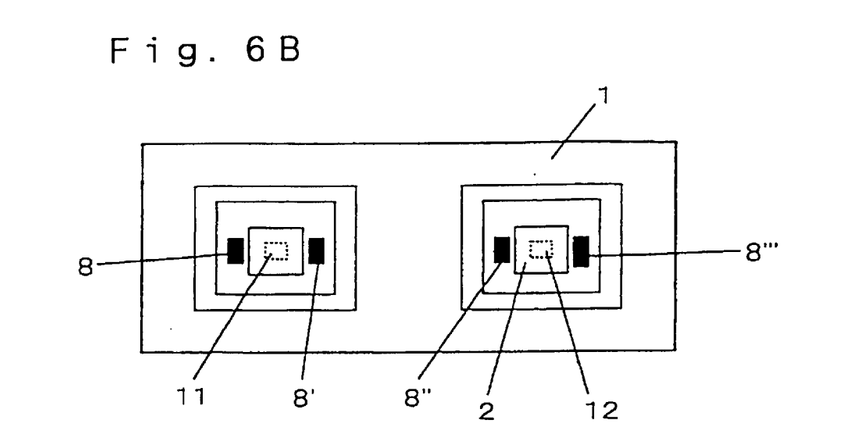

FIG. 6 is a schematic structural view showing a near-field optical head according to Embodiment 6 of the invention. A plurality of microscopic aperture portions 11, 12 are formed in a bottom surface of a slider 1, respective of which can protrude in a direction toward a recording medium 3 due to piezoelectric elements 8, 8', 8", 8'''. The other structures and manufacturing method are the same as in Embodiment 4, omitting explanations thereof FIG. 6(b) is a head top view wherein the piezoelectric elements 8, 8', 8", 8''' are bonded on both sides of the microscopic apertures 11, 12. The piezoelectric elements 8", 8''' are applied by a greater voltage than a voltage applied to the piezoelectric elements 8, 8', thereby making h" smaller than h'. Thus, in a slider bottom surface a vicinity portion 10 of the microscopic aperture is closer to a surface of a recording medium 3 than 9. In addition to the effect possessed by Embodiment 4, this structure allows the microscopic aperture 12 to cause interaction with higher sensitivity than 11. It was made possible to use the microscopic aperture 12 in data recording/ reproducing and the microscopic aperture 11 in tracking. It was made possible to use the microscopic aperture 11 in rough recording/reproducing at high speed and the microscopic aperture 12 in recording/reproducing with high density or verifying reproduced information or the like. Thus, various applications are possible.

(Embodiment 7)

In Embodiments 4,5 and 6, the rapid change of application voltage to the piezoelectric elements 8, 8', 8", 8''' can cause the microscopic aperture 7 portion to protrude from the slider 1 surface and be accommodated in the slider 1 surface at the same time of recording/reading. Due to this, in addition to the effects possessed by Embodiment 4, 5 and 6, the present embodiment can access not only a land but also a groove where the recording medium surface has a concave/convex as in a land/groove recording scheme. Thus, high density recording/reproducing became possible.

(Embodiment 8)

Figure 8:
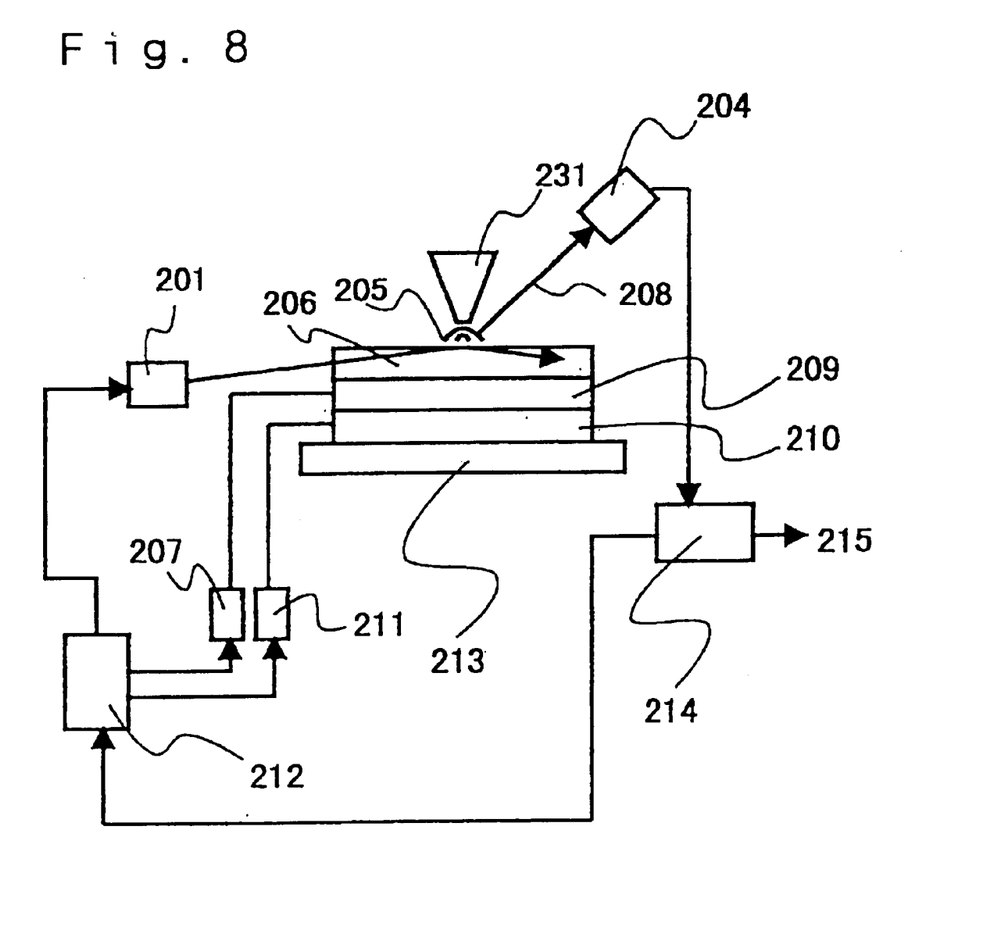
FIG. 8 is a schematic structural view of an information reproducing apparatus using a near-field optical head according to Embodiment 8 of this invention.

FIG. 8 is a block diagram showing a schematic structure of an information recording/reproducing apparatus according to Embodiment 8 of the invention. The difference from FIG. 7 lies in that a near-field optical head 231 at its tip uses a probe having a tip-sharpened protrusion having a size of approximately 100 nm instead of a microscopic aperture as in FIG. 7 and that an incident light from a laser 201 is introduced from below a recording medium 206 to produce a near-field light 205 on a surface of the recording medium 206 due to total reflection. The others are the same as FIG. 7, and explanations thereof are omitted. The incident light is introduced through an optical fiber (not shown) to a side surface of the recording medium 206 and propagates through an inside of the recording medium 206 due to total reflection. On the surface of the recording medium 206 a near-field light 205 is caused by the inside total reflection. The near-field light 205 differs in its intensity distribution depending on an optical characteristic on the recording medium 206 surface, i.e. a presence or absence of a data mark. This near-field light 205 is scattered by a near-field optical probe 231 into a scattering light 208 to be detected by a light detecting element 204. The detected signal is sent to a signal processing circuit 214. The signal processing circuit 214 outputs an output signal 215 and a signal to be sent to a control circuit 212. The control circuit 212 outputs signals to actuators 207, 211 whereby a rough movement mechanism 210 and fine movement mechanism 209 control a z-directional position of the recording medium 206.

Figure 9:
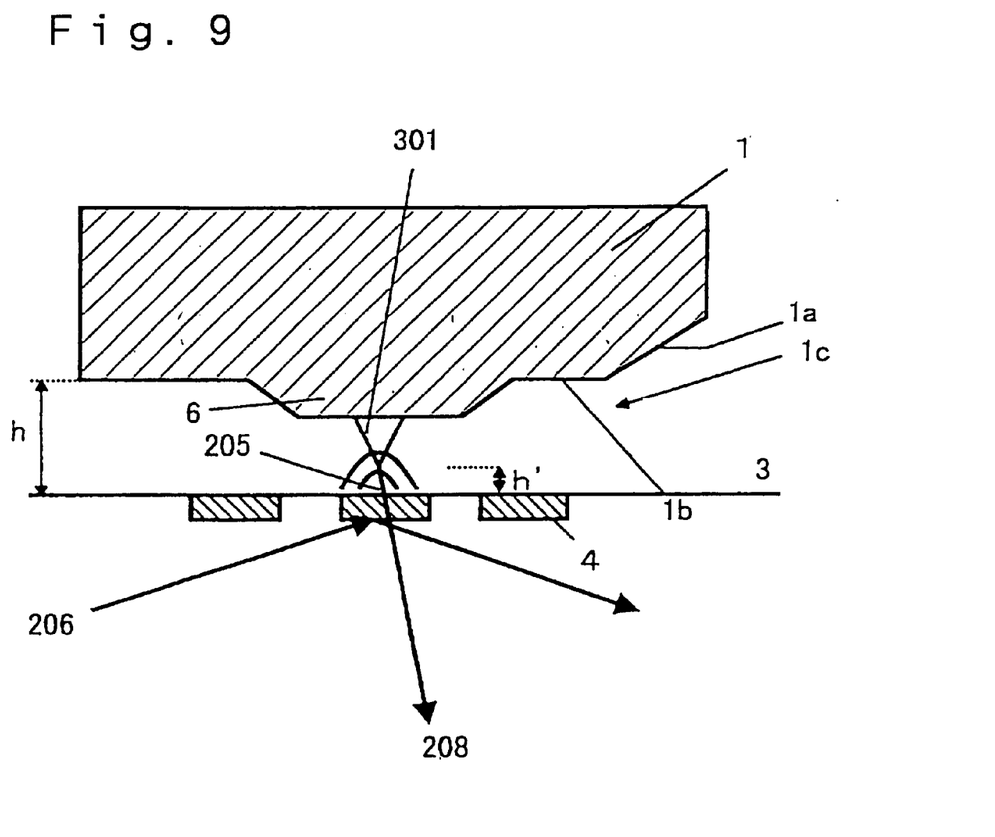
FIG. 9 is a schematic structural view showing a near-field optical head according to Embodiment 8 of this invention.

FIG. 9 shows a near-field optical head in the present embodiment. The difference from FIG. 1 lies in that a probe uses a microscopic protrusion 301 instead of a microscopic aperture. The near-field light 205 caused by interaction between an incident light 206 and a memory region 4 is converted by the microscopic protrusion 301 into a scattering light 208. The scattering light 208 may be detected of an component directed toward upward of the recording medium 206 as shown in FIG. 8. Or otherwise, as shown in FIG. 9 it is possible to detect a component transmitted through an inside of the recording medium 206. Because the near-field light 205 attenuates exponentially as going away from the recording medium surface, there is necessity to place the microscopic protrusion 301 in a position as close as possible to the recording medium surface. However, in the present embodiment the microscopic protrusion is structured protruding from a slider bottom surface toward the recording medium, and hence can be interacted with a near-field light in a proximity fashion. This realized a high sensitive near-field optical head. Also, the microscopic protrusion if combined with a vertically moving mechanism as in Embodiment 4 can protect the microscopic protrusion from being damaged during head standstill.

(Embodiment 9)

Figure 10:
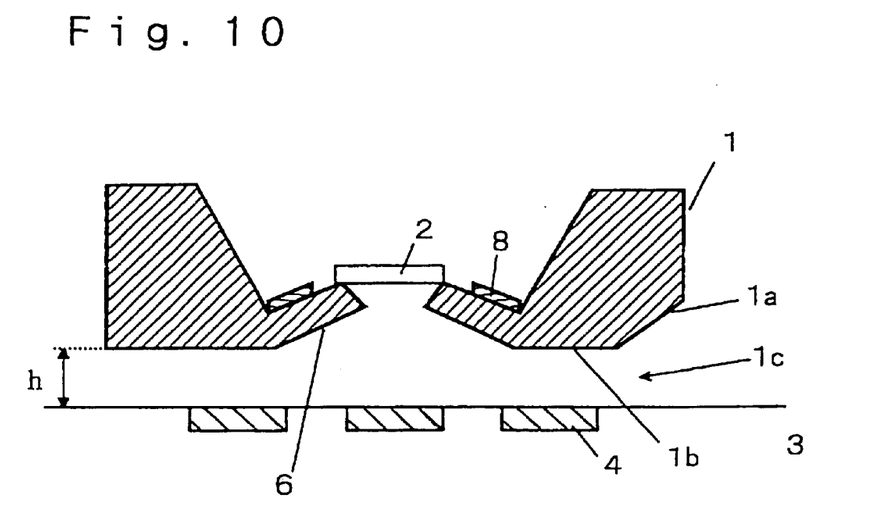
FIG. 10 is a schematic structural view showing a near-field optical head according to Embodiment 9 of this invention.

FIG. 10 is a schematic structural view showing a near-field optical head according to Embodiment 9 of the invention. The difference from FIG. 4 lies in that an aperture is positioned in a depressed position located above a slider bottom surface. The other structures and operation mechanisms are the same as those of Embodiment 4, and explanations thereof are omitted. During head standstill, the aperture is above the slider bottom surface and accordingly not contacted with the recording medium 3. Thus, the aperture was prevented against damage. It is possible to realize a similar structure with a probe having a microscopic protrusion as in Embodiment 8, offering a similar effect.

INDUSTRIAL APPLICABILITY

As explained above, according to a near-field optical head of this invention, in a near-field optical head, having: a slider supported by a suspension arm providing a load weight and obtaining a floating force due to a relative motion to a recording medium, and producing a gap cooperatively with the recording medium due to a balance between the load weight and the floating force; and a probe formed in a bottom surface of the slider, and producing a near-field light or converting a near-field light produced on a surface of a recording medium into a propagation light; wherein the recording medium and the probe interact through the near-field light when the slider scans a surface of the recording medium thereby effecting recording and reproducing information; the near-field optical head characterized in that: the probe protrudes from the slider bottom surface. Accordingly, even if the distance between the slider and the recording medium is several tens to several hundreds nano-meters, it is possible to reduce the distance between the probe and the recording medium to as small as several to several tens nano-meters. This enhances interaction between the near-field light and the recording medium, thereby enabling recording with high sensitivity and high density. Also, at a start and stop of head operation, the slider bottom surface and the recording medium are small in contact area and hence can be protected from damage due to contact.

Also, according to a near-field optical head of the invention, in the first-stated near-field optical head, the probe is a microscopic aperture. Accordingly, in addition to the first-stated effect, it is possible to cause interaction between the recording medium and the probe due to a light principally based on a near-field light. Thus, high S/N is obtainable.

Also, according to a near-field optical head of the invention, in the first-stated near-field optical head, the probe is a microscopic protrusion. Accordingly, in addition to the first-stated effect, it is satisfactory to form as a probe a simplified protrusion without having an internal structure. Therefore, the probe is easy to manufacture, and can be stably manufactured at low cost.

Also, according to a near-field optical head of the invention, in any one of the above near-field optical heads, a mechanism is comprised which accommodates the probe in the slider bottom surface or an inside of the slider except upon recording or reproducing of the information, and protrudes the probe from the slider bottom surface by or in a predetermined amount or direction upon recording or reproducing the information. Accordingly, in addition to any of the effects, the slider bottom surface and the recording medium surface can be protected from damage in respective modes of during head standstill and at operation start/stop. Also, the parallel arrangement of the probe with the recording medium surface realizes high sensitive head.

Also, according to a near-field optical head of the invention, in any one of the above near-field optical heads, the probe is formed in a plurality of number in the slider bottom surface, the plurality of probes being individually set with the amount or direction of protrusion or both thereof on an each probe basis. Accordingly, in addition to any of the effects, it becomes possible to set a sensitivity on a probe-by-probe basis. Also, one probe can be utilized for tracking or high-speed reproduction.

Also, a near-field optical head according to the invention, in any one of the above near-field optical heads, is characterized by comprising a mechanism which simultaneously performs control of the amount or direction of protrusion of the probe or both thereof, and scans the slider over the recording medium. Accordingly, in addition to any of the effects, it becomes possible to control sensitivity, resolution and the like simultaneously with data recording/reproducing. Also, even where there are concaves and convexes on the recording medium surface, because recording/reproducing is possible, increase of density is possible.

Also, a near-field optical head of the invention, is characterized by comprising: a slider supported by a suspension arm providing a load weight and obtaining a floating force due to a relative motion to a recording medium, and producing a gap cooperatively with the recording medium due to a balance between the load weight and the floating force; at least one hole in an inverted frustum form formed through the slider so as to provide at an apex a microscopic aperture in the slider bottom surface; and a light emitting element or light detecting element provided in a bottom of the inverted frustum formed hole; wherein a distance between the microscopic aperture and the light emitting element or light detecting element is given shorter than a thickness of the slider. Accordingly, even if the thickness of the slider is several hundred micro-meters, it is possible to reduce a distance between the microscopic aperture and the light emitting element or light detecting element to several tens micro-meters. Thus, the intensity of light at the microscopic aperture can be increased thereby realizing a high sensitivity head.

What is claimed is:

1. A near-field optical head, comprising:
   a slider supported by a suspension arm providing a load weight and obtaining a floating force due to a relative motion of the slider with respect to a recording medium so that a gap is produced between a bottom surface of the slider and a surface of the recording medium due to a balance between the load weight and the floating force; and
   a probe comprising a through-hole formed in a reduced thickness portion of the slider and terminating in a microscopic aperture at the bottom surface of the slider for producing a near-field light or converting a near-field light produced on a surface of the recording medium into a propagation light without a lens being disposed proximate the microscopic aperture for producing or converting the near-field light, and a light source mounted on a top surface of the reduced thickness portion of the slider above the through hole, so that a light path is defined by the light source, the through-hole, and the microscopic aperture;
   wherein the recording medium and the probe interact through the near-field light when the slider is caused to undergo scanning movement relative to a surface of the recording medium to thereby effect at least one of the recording of information onto the recording medium and the reproducing of information stored on the recording medium; and
   wherein the microscopic aperture is provided in a protruding portion of the bottom surface of the slider that protrudes toward the recording medium so that a distance between the microscopic aperture and the recording medium is smaller than a distance between a non-protruding portion of the bottom surface of the slider closest to the recording medium and the recording medium so that the probe can be brought to within several nanometers to several tens of nanometers close to the recording medium to enable high resolution optical reading and/or recording of data on the recording medium.

2. A near-field optical head according to claim 1; further comprising a through-hole formed in the slider and terminating in the microscopic aperture.

3. A near-field optical head according to claim 1; further comprising a through-hole formed in the slider and terminating in the microscopic aperture; a light shielding layer covering the through-hole except for the microscopic aperture; and a light source mounted on a top surface of the slider above the through hole, so that a light path is defined by the light source, the through-hole, and the microscopic aperture.

4. A near-field optical head according to claim 1; further comprising a light shielding layer covering the through-hole except for the microscopic aperture.

5. A near-field optical head according to claim 2; further comprising a light shielding layer covering the through-hole except for the microscopic aperture.

6. A near-field optical head according to claim 5; further comprising a light source disposed on a top surface of the slider above the through-hole so that a light path is defined by the light source, the through-hole, and the microscopic aperture.

7. A near-field optical head comprising: a support member mounted to undergo relative movement with respect to a sample; and a probe protruding from a bottom surface of the support member and comprised of a through-hole formed in a reduced thickness portion of the support member and terminating in a microscopic aperture at the bottom surface of the support member for producing a near-field light or converting a near-field light produced at a surface of the sample into a propagation light without a lens being disposed proximate the microscopic aperture for producing or converting the near-field light; and a light source disposed on a top surface of the reduced thickness portion of the support member above the through hole, so that a light path is defined by the light source, the through-hole, and the microscopic aperture; wherein the sample and the probe interact through the near-field light when the support member undergoes relative movement with respect to the surface of the sample; and wherein the microscopic aperture is provided in a protruding portion of the bottom surface of the support member closer to the sample than a non-protruding portion of the bottom surface of the support member so that the microscopic aperture can be brought to within several nanometers to several tens of nanometers close to the sample.

8. A near-field optical head according to claim 7; wherein the support member comprises a slider supported by a suspension arm for providing a load weight and producing a floating force in response to relative motion thereof with respect to the sample so that a gap is formed between the probe and the sample due to a balance between the load weight and the floating force.

9. A near-field optical head according to claim 7; wherein the probe comprises a tapered projection mounted to the support member and having a sharpened tip protruding from the bottom surface of the support member.

10. A near-field optical head according to claim 7; further comprising a through-hole formed in the support member and terminating in the microscopic aperture.

11. A near-field optical head according to claim 7; further comprising a through-hole formed in the support member and terminating in the microscopic aperture; a light shielding layer covering the through-hole except for the microscopic aperture; and a light source disposed on a top surface of the support member above the through hole, so that a light path is defined by the light source, the through-hole, and the microscopic aperture.

12. A near-field optical head according to claim 7; further comprising a light shielding layer covering the through-hole except for the microscopic aperture.

13. A near-field optical head according to claim 10; further comprising a light shielding layer covering the through-hole except for the microscopic aperture.

14. A near-field optical head according to claim 13; further comprising a light source disposed on a top surface of the support member above the through hole so that a light path is defined by the light source, the through-hole, and the microscopic aperture.

15. A near-field optical head, comprising:
   a slider supported by a suspension arm providing a load weight and obtaining a floating force due to a relative motion of the slider with respect to a recording medium so that a gap is produced between a bottom surface of the slider and a surface of the recording medium due to a balance between the load weight and the floating force; and a probe comprising a through-hole formed in a reduced thickness portion of the slider and terminating in a microscopic aperture at the bottom surface of the slider for producing a near-field light or converting a near-field light produced on a surface of the recording medium into a propagation light without a lens being disposed proximate the microscopic aperture for producing or converting the near-field light, and a light source mounted on the reduced thickness portion of the slider above the through-hole, so that a light path is defined by the light source, the through-hole, and the microscopic aperture;

wherein the recording medium and the probe interact through the near-field light when the slider is caused to undergo scanning movement relative to a surface of the recording medium to thereby effect the recording of information onto the recording medium and the reproducing of information stored on the recording medium; and wherein the microscopic aperture is provided in a protruding portion of the bottom surface of the slider that protrudes toward the recording medium so that a distance between the microscopic aperture and the recording medium is smaller than a distance between a non-protruding portion of the bottom surface of the slider closest to the recording medium and the recording medium so that the probe can be brought to within several nanometers to several tens of nanometers close to the recording medium to enable high resolution optical reading and/or recording of data on the recording medium by the use of near-field light alone and without the use of a coil to locally heat the recording medium.

16. A near-field optical head according to claim 15; further comprising a light shielding layer covering the through-hole except for the microscopic aperture.

17. A near-field optical head comprising: a support member mounted to undergo relative movement with respect to a recording medium; and a probe protruding from a bottom surface of the support member and having a through-hole formed in a reduced thickness portion of the support member and terminating in a microscopic aperture for producing a near-field light or converting a near-field light produced at a surface of the recording medium into a propagation light without a lens being disposed proximate the microscopic aperture for producing or converting the near-field light, and a light source disposed on a top surface of the reduced thickness portion of the support member above the through-hole, so that a light path is defined by the light source, the through-hole, and the microscopic aperture; wherein the recording medium and the probe interact through the near-field light when the support member undergoes relative movement with respect to the surface of the recording medium; and wherein a part of the bottom surface of the support member closest to the recording medium is more distant from the recording medium than the microscopic aperture so that the microscopic aperture can be brought to within several nanometers to several tens of nanometers close to the sample to enable optical reading and/or recording of data on the recording medium by the use of near-field light alone and without the use of a coil to locally heat the recording medium.

18. A near-field optical head according to claim 17; further comprising a light shielding layer covering the through-hole except for the microscopic aperture.

* * * * *